US010097682B2

(12) United States Patent
Lupcho, III et al.

(10) Patent No.: US 10,097,682 B2
(45) Date of Patent: Oct. 9, 2018

(54) SYSTEM FOR DETERMINING AVAILABLE SERVICES BASED ON USER LOCATION

(71) Applicant: Bank of America Corporation, Charlotte, NC (US)

(72) Inventors: Albert R. Lupcho, III, Jacksonville, FL (US); Christina Jasko, Allendale, NJ (US); John J. Wilson, Madison, NJ (US); Michael D. Lamb, Langhorne, PA (US); Sara M. Towers, Phoenix, AZ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/942,649

(22) Filed: Nov. 16, 2015

(65) Prior Publication Data
US 2017/0142251 A1    May 18, 2017

(51) Int. Cl.
H04M 1/725    (2006.01)
H04W 4/02    (2018.01)
(52) U.S. Cl.
CPC ......... H04M 1/72572 (2013.01); H04W 4/02 (2013.01)
(58) Field of Classification Search
CPC .... G06Q 30/0643; H04W 4/02; H04W 4/021; G08G 1/0969
See application file for complete search history.

(56) References Cited

U.S. PATENT DOCUMENTS

| | | | |
|---|---|---|---|
| 5,241,466 A | 8/1993 | Perry et al. | |
| 6,009,410 A | 12/1999 | LeMole et al. | |
| 7,181,304 B2 | 2/2007 | Key | |
| 7,467,107 B1 | 12/2008 | Mulligan, Jr. | |
| 7,512,555 B2 | 3/2009 | Finn | |
| 7,627,391 B2 | 12/2009 | Key | |
| 7,672,889 B2 | 3/2010 | Brooks | |
| 7,813,827 B2 | 10/2010 | Key | |
| 8,290,948 B2 | 10/2012 | Shuster et al. | |

(Continued)

Primary Examiner — Kathy Wang-Hurst
Assistant Examiner — Ernest Tacsik
(74) Attorney, Agent, or Firm — Banner & Witcoff, Ltd.; Michael A. Springs

(57) ABSTRACT

Some aspects as disclosed herein are directed to, for example, a system for determining a geographical location of a user, such as via a data input, a network address, and/or a location sensor. A computing device of the system may determine a plurality of prompts for the user based on the determined geographical location of the user and may generate one or more user interfaces configured to display the plurality of prompts. Data input responding to one or more of the plurality of prompts may be received via the one or more user interfaces. It may be determined, based on the data input, whether to approve the user for one or more services. Additionally or alternatively, a computing device may determine a plurality of available services for the user based on the determined geographical location of the user and may generate one or more user interfaces configured to display the plurality of available services. Data input indicating a selection of one or more of the plurality of available services may be received via the one or more user interfaces. Based on the data input, a request to enroll the user in the selected one or more of the plurality of available services may be generated.

15 Claims, 13 Drawing Sheets

(56) References Cited

U.S. PATENT DOCUMENTS

| | | |
|---|---|---|
| 8,527,394 B2 | 9/2013 | Chung |
| 8,788,412 B1 | 7/2014 | Hamm |
| 2001/0042036 A1 | 11/2001 | Sanders |
| 2002/0046091 A1 | 4/2002 | Mooers et al. |
| 2002/0116242 A1 | 8/2002 | Vercellone et al. |
| 2008/0167948 A1* | 7/2008 | Park ................ G06Q 30/02 705/7.33 |
| 2009/0157543 A1 | 6/2009 | Greig, Jr. et al. |
| 2009/0164389 A1 | 6/2009 | Finn |
| 2009/0240746 A1 | 9/2009 | Chirlian et al. |
| 2011/0209073 A1* | 8/2011 | Larson ............ G06F 17/3089 715/760 |
| 2013/0144807 A1 | 6/2013 | Packles et al. |
| 2013/0166475 A1 | 6/2013 | Packles et al. |
| 2014/0095409 A1 | 4/2014 | Bohman |
| 2014/0351105 A1 | 11/2014 | Hamm |
| 2014/0365253 A1 | 12/2014 | Byers et al. |
| 2015/0019374 A1* | 1/2015 | Robinson .......... G06Q 30/0259 705/26.7 |
| 2015/0172395 A1* | 6/2015 | Jackson ............. H04L 67/18 709/204 |
| 2016/0135006 A1* | 5/2016 | Fjeldsoe-Nielsen ............ H04B 1/3827 455/456.3 |

\* cited by examiner

<Logo> | Computing Platform | Settings | Help

Please answer the following questions.

910

Question 1: [Answer 1c ▽]

Question 2: [Answer 2a ▽]

Question 4: [<text>        ]

Question 5: [Yes |X]  [No | ]

· · ·

[Submit] — 920

1000

<Logo> | Computing Platform | Settings | Help

Please answer the following question.

1010 — Question 1: [Answer 1c ▽]

Submit — 1020

FIG. 10A

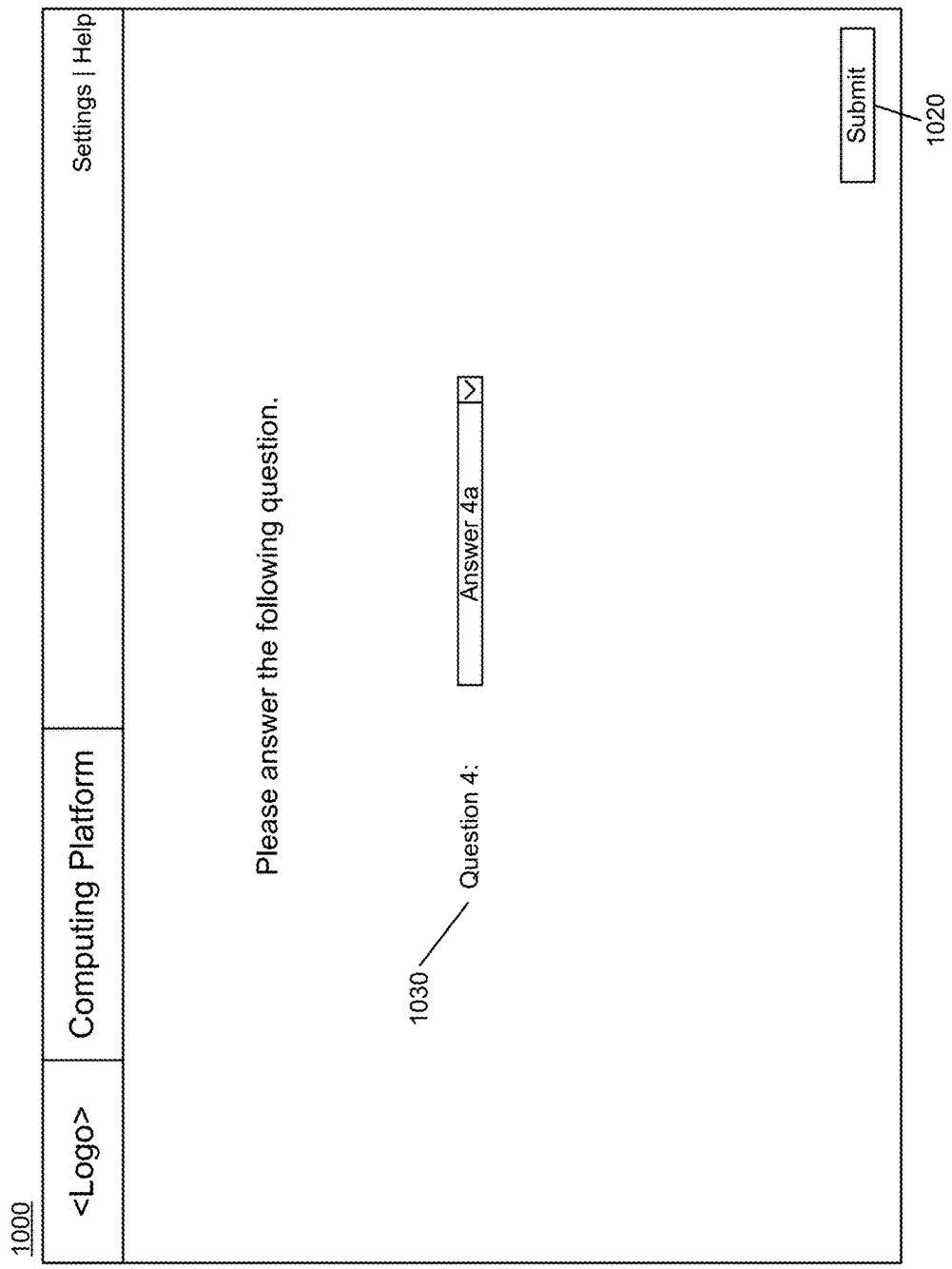

Please select services to enroll the client in.

Service 1: [Yes X] [No ]
Service 2: [Yes X] [No ]
Service 4: [Yes ] [No X]
Service 5: [Yes X] [No X]

...

1200 — <Logo> | Computing Platform | Settings | Help
1210 — Service list
1220 — Submit

SYSTEM FOR DETERMINING AVAILABLE SERVICES BASED ON USER LOCATION

CROSS-REFERENCE TO RELATED APPLICATIONS

This application is related to U.S. patent application Ser. No. 14/942,635 entitled "System For Determining User Interfaces To Display Based On User Location", which is filed concurrently herewith. The related application is herein incorporated by reference in its entirety.

TECHNICAL FIELD

One or more aspects of the disclosure generally relate to a system and network of computing devices that may be used to determine a location of a user and to determine user interfaces to display and/or available services based on the determined location of the user.

BACKGROUND

Users of a computing system may be located all over the world and in many different jurisdictions. Each jurisdiction may have a different set of rules. When the user desires to sign up for a service or to access a computing system, the user may attempt to access the system, but might be displayed incorrect or duplicative user interfaces or the user interfaces may have more information than the jurisdiction requires.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system comprising a user device having a first processor, a display screen, a location sensor, and first memory. The first memory may store computer-executable instructions that, when executed by the first processor, cause the user device to determine a geographical location of a user of the user device, and send the geographical location of the user to a user interface (UI) generation computing device. The system may comprise the UI generation computing device having a second processor, and second memory. The second memory may store computer-executable instructions that, when executed by the second processor, cause the UI generation computing device to determine a plurality of prompts for the user based on the determined geographical location of the user. The UI generation computing device may generate one or more user interfaces configured to display the plurality of prompts and receive, from the user device and via the one or more user interfaces, data input responding to one or more of the plurality of prompts. The UI generation computing device may also determine, based on the data input, whether to approve the user for one or more services.

In some aspects, determining the geographical location of the user may comprise performing at least one or more of determining the geographical location of the user based on a network address of the user device, or receiving location data from the location sensor of the user device and determining the geographical location of the user based on the location data received from the location sensor. Additionally or alternatively, determining the geographical location of the user may comprise displaying, on the display screen of the user device, a user interface requesting input of the geographical location of the user, and receiving, at the user device via an input/output module of the user device, input of the geographical location.

In some aspects, generating the one or more user interfaces configured to display the plurality of prompts may comprise generating the one or more user interfaces to include the determined plurality of prompts and to exclude one or more prompts not associated with the determined geographical location of the user. In other aspects, generating the one or more user interfaces configured to display the plurality of prompts may comprise generating the one or more user interfaces to include the determined plurality of prompts and to include one or more prompts not associated with the determined geographical location of the user. The one or more prompts not associated with the determined geographical location may be graphically distinguishable from the determined plurality of prompts.

In some aspects, determining whether to approve the user for one or more services may comprise sending, by the UI generation computing device, the data input to a governance computing device. The governance computing device may determine whether to approve the user for the one or more services based on the data input received by the governance computing device.

Some aspects as disclosed herein are directed to, for example, a method comprising determining a geographical location of a user and determining, by a computing device, a plurality of prompts for the user based on the determined geographical location of the user. The computing device may generate one or more user interfaces configured to display the plurality of prompts. The method may comprise receiving, via the one or more user interfaces, data input responding to one or more of the plurality of prompts. It may be determined, based on the data input, whether to approve the user for one or more services.

In some aspects, determining the geographical location of the user may comprise performing at least one or more of determining the geographical location of the user based on a network address of a user device associated with the user, or determining the geographical location of the user based on a location sensor of the user device associated with the user. Additionally or alternatively, determining the geographical location of the user may comprise receiving, from a user device, a user selection of the geographical location.

In some aspects, generating the one or more user interfaces configured to display the plurality of prompts may comprise generating the one or more user interfaces to include the determined plurality of prompts and to exclude one or more prompts not associated with the determined geographical location of the user. In other aspects, generating the one or more user interfaces configured to display the plurality of prompts may comprise generating the one or more user interfaces to include the determined plurality of prompts and to include one or more prompts not associated with the determined geographical location of the user. One or more prompts not associated with the determined geographical location may be graphically distinguishable from the determined plurality of prompts.

In some aspects, determining whether to approve the user for one or more services may comprise automatically approving the user for the one or more services based on a determination that the data input satisfies a predefined condition for automatic approval. Determining whether to approve the user for one or more services may comprise sending, by the computing device, the data input to a governance computing device. The governance computing device may determine whether to approve the user for the one or more services based on the data input received by the governance computing device.

Some aspects as disclosed herein are directed to, for example, a system comprising a user device having a first processor, a display screen, a location sensor, and first memory. The first memory may store computer-executable instructions that, when executed by the first processor, cause the user device to determine a geographical location of a user of the user device, and send the geographical location of the user to a user interface (UI) generation computing device. The UI generation computing device may comprise a second processor and second memory. The second memory may store computer-executable instructions that, when executed by the second processor, cause the UI generation computing device to determine a plurality of available services for the user based on the determined geographical location of the user. The UI generation computing device may generate one or more user interfaces configured to display the plurality of available services. The UI generation computing device may receive, from the user device and via the one or more user interfaces, data input indicating a selection of one or more of the plurality of available services. The UI generation computing device may generate, based on the data input, a request to enroll the user in the selected one or more of the plurality of available services.

In some aspects, determining the geographical location of the user may comprise performing at least one or more of determining the geographical location of the user based on a network address of the user device, or receiving location data from the location sensor of the user device and determining the geographical location of the user based on the location data received from the location sensor. Additionally or alternatively, determining the geographical location of the user may comprise displaying, on the display screen of the user device, a user interface requesting input of the geographical location of the user, and receiving, at the user device via an input/output module of the user device, input of the geographical location.

In some aspects, generating the one or more user interfaces configured to display the plurality of available services may comprise generating the one or more user interfaces to include the determined plurality of available services and to exclude one or more services not available at the determined geographical location of the user. In other aspects, generating the one or more user interfaces configured to display the plurality of available services may comprise generating the one or more user interfaces to include the determined plurality of available services and to include one or more services not available at the determined geographical location of the user. The one or more services not available at the determined geographical location may be graphically distinguishable from the determined plurality of available services.

In some aspects, determining the plurality of available services for the user based on the determined geographical location of the user may comprise determining the plurality of available services for the user based on the determined geographical location of the user and based on at least one or more additional factor.

Some aspects as disclosed herein are directed to, for example, a method comprising determining a geographical location of a user, and determining, by a computing device, a plurality of available services for the user based on the determined geographical location of the user. The computing device may generate one or more user interfaces configured to display the plurality of available services. The method may comprise receiving, via the one or more user interfaces, data input indicating a selection of one or more of the plurality of available services. The method may comprise generating, based on the data input, a request to enroll the user in the selected one or more of the plurality of available services.

In some aspects, determining the geographical location of the user may comprise performing at least one or more of determining the geographical location of the user based on a network address of a user device associated with the user, or determining the geographical location of the user based on a location sensor of the user device associated with the user. Additionally or alternatively, determining the geographical location of the user may comprise receiving, from a user device, a user selection of the geographical location.

In some aspects, generating the one or more user interfaces configured to display the plurality of available services may comprise generating the one or more user interfaces to include the determined plurality of available services and to exclude one or more services not available at the determined geographical location of the user. In other aspects, generating the one or more user interfaces configured to display the plurality of available services may comprise generating the one or more user interfaces to include the determined plurality of available services and to include one or more services not available at the determined geographical location of the user. One or more services not available at the determined geographical location may be graphically distinguishable from the determined plurality of available services.

In some aspects, determining the plurality of available services for the user based on the determined geographical location of the user may comprise determining the plurality of available services for the user based on the determined geographical location of the user and based on at least one or more additional factor.

In some aspects, the method may comprise sending, by the computing device, the request to enroll the user in the selected one or more of the plurality of available services to a governance computing device. The governance computing device may determine whether to enroll the user in the selected one or more of the plurality of available services. One or more aspects described herein may be used for enrollment and/or account updates to ensure that enrollment and/or updates are permitted or blocked based on a client's residency.

BRIEF DESCRIPTION OF THE DRAWINGS

The present disclosure is illustrated by way of example and not limited in the accompanying figures in which like reference numerals indicate similar elements and in which:

FIG. 8 illustrates an example user interface for displaying questions and receiving selections or other data input in which various aspects of the disclosure may be implemented.

FIG. 9 illustrates another example user interface for displaying questions and receiving selections or other data input in which various aspects of the disclosure may be implemented.

FIGS. 10A-B illustrate yet other example user interfaces for displaying questions and receiving selections or other data input in which various aspects of the disclosure may be implemented.

FIG. 11 illustrates an example user interface for displaying available services and receiving selections or other data input in which various aspects of the disclosure may be implemented.

FIG. 12 illustrates another example user interface for displaying available services and receiving selections or other data input in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
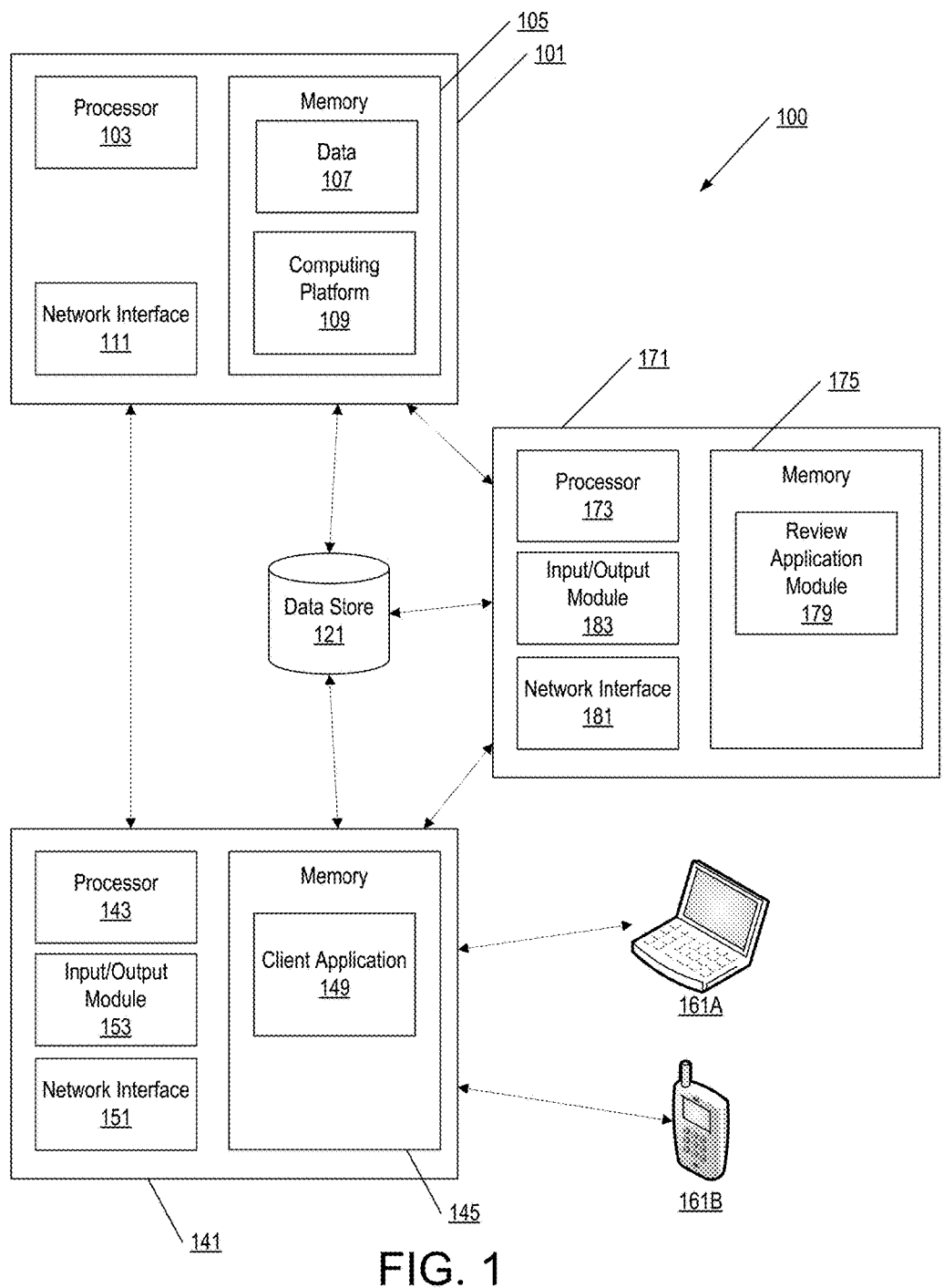
FIG. 1 illustrates an example system and network of computing devices in which various aspects of the disclosure may be implemented.

FIG. 1 illustrates an example system and network of computing devices 100 in which various aspects of the disclosure may be implemented. The system may include a user interface (U/I) and prompt generation computing device 101 having have a processor 103 for controlling overall operation of the computing device 101 and its associated components, including for example, random access memory (RAM), read-only memory (ROM), and input/output (I/O) modules (not illustrated). The U/I and prompt generation computing device 101 may include memory 105 that stores data 107, such as U/Is, prompts, and/or services generated or determined by the computing device 101, as will be described in further detail below. The memory 105 may also store a computing platform 109. The computing platform 109 may be used to determine various U/Is, prompts, and/or available services for users of the computing platform 109. Software may be stored within memory 105 and/or other storage to provide instructions to processor 103 for enabling the U/I and prompt generation computing device 101 to perform various functions. For example, memory 115 may store software used by the computing device 101, such as an operating system, application programs (including computing platform 109), and an associated database. Additionally or alternatively, some or all of the computer executable instructions for the U/I and prompt generation computing device 101 may be embodied in hardware or firmware (not shown).

The U/I and prompt generation computing device 101 may operate in a networked environment supporting connections to one or more other computing devices, such as a data store 121, one or more user workstation 141, one or more user devices 161A and 161B, and a governance computing device 171. The U/I and prompt generation computing device 101 may include a network interface 111 for communicating with these other devices, such as via a local area network (LAN), a wide area network (WAN), or any other type of network. It will be appreciated that the network connections shown are illustrative and other means of establishing a communications link between the computing devices may be used, such as TCP/IP, Ethernet, FTP, HTTP, HTTPS, and the like.

The system 100 may include a data store 121. The data store 121 may be used to store data, such as data used to generate U/Is, various prompts, and/or services available to users of the computing platform 109. The data store 121 may be used to store other types of information, as will be described below.

The system 100 may include one or more workstation 141. The workstation may be used by a user, such as an employee, a contractor, an advisor, and the like, to assist a client or prospective client to register for or use a service provided by an institution. The workstation 141 may comprise a processor 143 for controlling overall operation of the workstation 141 and its associated components, including for example, random access memory (RAM) and read-only memory (ROM) (not illustrated). The processor 143 may also control operation of an input/output (I/O) module 153. The I/O module 153 may include, e.g., a microphone, mouse, keypad, touch screen, scanner, optical reader, and/or stylus (or other input device(s)) through which a user of the workstation 141 may provide input, and may also include one or more of a speaker for providing audio output and a video display device for providing textual, audiovisual, and/or graphical output.

The workstation 141 may include memory 145 that stores a client application 149. The client application 149 may communicate with the computing platform 109 of the computing device 101 to generate, for example, U/Is for display on a display of the workstation 141. The U/Is may display prompts requesting answers from users and/or display the services available to a particular client or prospective client, as will be described below. Software may be stored within memory 145 and/or other storage to provide instructions to processor 143 for enabling the workstation 141 to perform various functions. For example, memory 145 may store software used by the workstation 141, such as an operating system, application programs (including client application 149), and an associated database. Additionally or alternatively, some or all of the computer executable instructions for the workstation 141 may be embodied in hardware or firmware (not shown).

The workstation 141 may operate in a networked environment supporting connections to one or more other computing devices, such as the U/I and prompt generation computing device 101, the data store 121, one or more other user workstations 141, one or more user devices 161A and 161B, and the governance computing device 171. The workstation 141 may include a network interface 151 for communicating with these other devices, such as via a local area network (LAN), a wide area network (WAN), or any other type of network. It will be appreciated that the network connections shown are illustrative and other means of establishing a communications link between the computing devices may be used, such as TCP/IP, Ethernet, FTP, HTTP, HTTPS, and the like.

The system 100 may include one or more client devices 161A and 161B (e.g., a desktop computer, a laptop computer, a tablet computer, a smartphone, and the like). The client devices 161A and/or 161B may belong to a client or prospective client, and may be used by the client to communicate with a user via the workstation 141 (or other computing device of the user). For example, the client devices 161A and 161B may send data, such as location data, client information, selection of services, and the like, to the workstation 141. Similarly, the workstation 141 may send data, such as available services, prompts, and U/Is, to the client devices 161A and 161B for display on their display screens.

The system 100 may include a governance computing device 171. The governance computing device 171 may be used by user, such as an employee, a contractor, an advisor, a governance group employee, and the like, to approve or disapprove the registration of a user and/or to approve the use of a service provided by the institution. The governance computing device 171 may comprise a processor 173 for controlling overall operation of the governance computing device 171 and its associated components, including for example, random access memory (RAM) and read-only memory (ROM) (not illustrated). The processor 173 may also control operation of an input/output (I/O) module 183. The I/O module 183 may include, e.g., a microphone, mouse, keypad, touch screen, scanner, optical reader, and/or stylus (or other input device(s)) through which a user of the governance computing device 171 may provide input, and may also include one or more of a speaker for providing audio output and a video display device for providing textual, audiovisual, and/or graphical output.

The governance computing device 171 may include memory 175 that stores a review application module 179. The review application module 179 may communicate with the client application 149 of the workstation 141 (or the computing platform 109 of the computing device 101) to receive selections of answers to prompts and/or to receive selections of one or more services provided by the institution, as will be described below. Software may be stored within memory 175 and/or other storage to provide instructions to processor 173 for enabling the governance computing device 171 to perform various functions. For example, memory 175 may store software used by the governance computing device 171, such as an operating system, application programs (including review application module 179), and an associated database. Additionally or alternatively, some or all of the computer executable instructions for the governance computing device 171 may be embodied in hardware or firmware (not shown).

The governance computing device 171 may operate in a networked environment supporting connections to one or more other computing devices, such as the U/I and prompt generation computing device 171, the data store 121, one or more user workstation 141, and one or more user devices 161A and 161B. The governance computing device 101 may include a network interface 181 for communicating with these other devices, such as via a local area network (LAN), a wide area network (WAN), or any other type of network. It will be appreciated that the network connections shown are illustrative and other means of establishing a communications link between the computing devices may be used, such as TCP/IP, Ethernet, FTP, HTTP, HTTPS, and the like.

Figure 2:
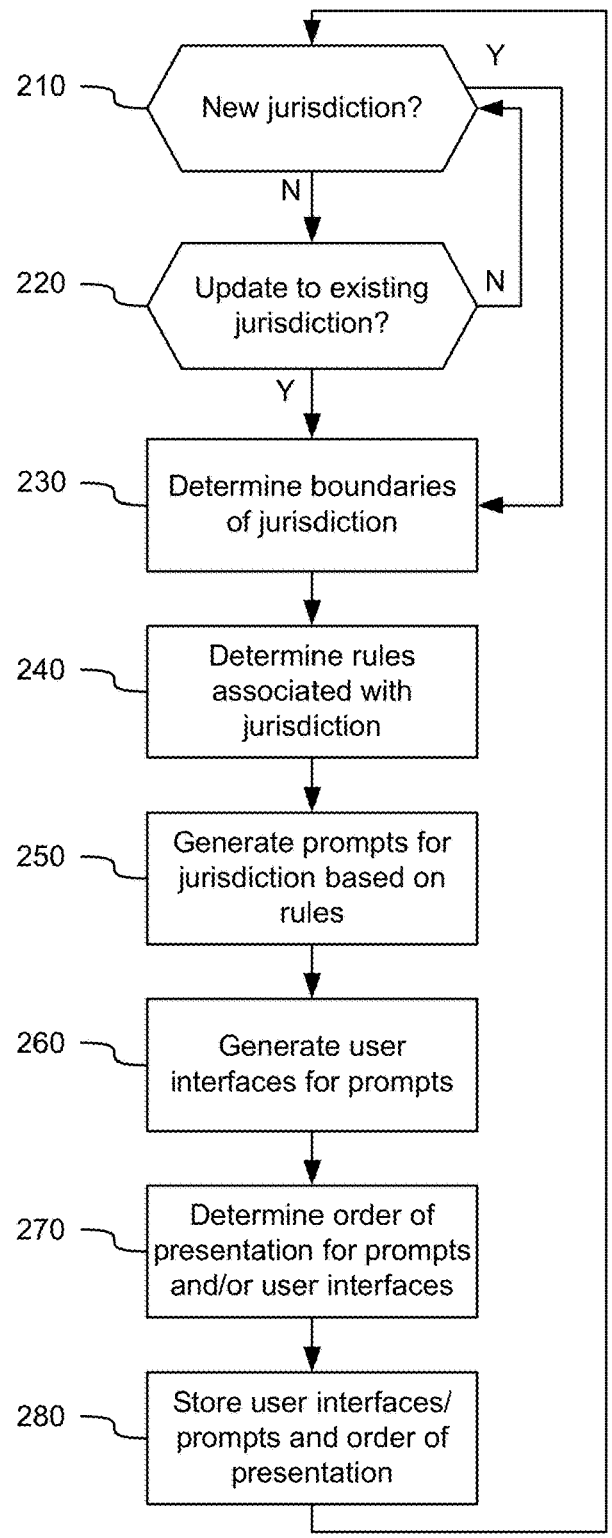
FIG. 2 illustrates an example of at least a portion of a flow diagram for determining prompts and/or user interfaces for one or more jurisdictions in which various aspects of the disclosure may be implemented.

FIG. 2 illustrates an example of at least a portion of a flow diagram for determining prompts and/or user interfaces for one or more jurisdictions in which various aspects of the disclosure may be implemented. The steps illustrated in FIG. 2 may be performed by one or more computing devices in the network of computing devices 100, such as by the U/I and prompt generation computing device 101 and/or the data store 121. A jurisdiction may comprise a geographical region having boundaries, such as a country, a territory, a continent, a province, a city, and the like. Each jurisdiction may have its own rules regarding the solicitation of new clients and services available to new and existing clients, such as investment choices, account types, and the like. Some jurisdictions may have the same rules, and other jurisdictions might have different rules. Because jurisdictions might have different rules, the system 100 illustrated in FIG. 1 may be used to determine those rules and to generate prompts, user interface(s), and/or an order of presentation of the user interface(s) for each jurisdiction.

In step 210, the U/I and prompt generation computing device 101 may determine whether a new jurisdiction has been or should be added to the system 100. New jurisdictions may be uploaded to the system 100, such as to the data store 121 or other storage device. The U/I and prompt generation computing device 101 may periodically or occasionally query the data store 121 to determine whether a new jurisdiction has been added. Additionally or alternatively, the data store 121 may generate a notification and send the notification to the U/I and prompt generation computing device 101 when a new jurisdiction has been added to the system. If the U/I and prompt generation computing device 101 determines that a new jurisdiction has been added (step 210: Y), the computing device 101 may proceed to step 230 to determine the boundaries of the new jurisdiction. If the computing device 101 determines that a new jurisdiction has not been added (step 210: N), the computing device 101 may proceed to step 220.

In step 220, the U/I and prompt generation computing device 101 may determine whether there has been an update to a jurisdiction already in the system 100, such as an update to the rules of the existing jurisdiction. New rules for existing jurisdictions may be uploaded to the system 100, such as to the data store 121 or other storage device. Additionally or alternatively, current rules may be revised or deleted from the system 100. The U/I and prompt generation computing device 101 may periodically or occasionally query the data store 121 to determine whether there is an update to an existing jurisdiction. Additionally or alternatively, the data store 121 may generate a notification and send the notification to the U/I and prompt generation computing device 101 when an update has occurred. If the computing device 101 determines that there has been no update (step 220: N), the computing device 101 may return to step 210 to wait for a new jurisdiction or an update to an existing jurisdiction. If, on the other hand, the computing device 101 determines that there has been an update to a jurisdiction existing in the system (step 220: Y), the computing device 101 may proceed to step 230.

In step 230, the U/I and prompt generation computing device 101 may determine the boundaries of the jurisdiction that has been updated or newly added. For example, the U/I and prompt generation computing device 101 may determine the boundaries of a country, a city, a region, a province, or any other jurisdictional boundaries. In some aspects, the computing device 101 may modify the boundaries of an existing jurisdiction if data uploaded to the data store 121 indicate a change in the boundaries.

In step 240, the U/I and prompt generation computing device 101 may determine the rules associated with the jurisdiction. Each jurisdiction may have specific rules, such as with respect to solicitation of a business or client (e.g., how the business or client was solicited by an advisor, when the business or client was solicited, and the like). For example, one jurisdiction's rules might not permit an advisor to solicit business from a client if the advisor is in the same jurisdiction as the client. Another jurisdiction's rules might not permit an advisor to solicit business from a client if the advisor is in a different jurisdiction from the client.

In step 250, the U/I and prompt generation computing device 101 may generate or otherwise determine prompts (e.g., questions) for the jurisdiction based on its rules. Example prompts include which jurisdiction a particular business was formed, where the trustees of a trust reside, where the client is located, and the like. The computing device 101 may assign a unique code (or other identifier) to each prompt, and the unique code may be stored with the prompt, such as in the data store 121 or other storage device. The computing device 101 may also generate or update a table or other data structure that correlates jurisdictions to prompts (and/or their corresponding identifiers). For example, the table may correlate Jurisdiction A with prompts 1-5, 7, 9-12, and 14. As another example, the table may correlate Jurisdiction B with prompts 1, 3-5, and 7-12. The table may include entries for any number of jurisdictions and their corresponding prompts.

Exemplary prompts include the category of the account owner (e.g., a trust, a natural person, a corporation, and the like), the identity of the advisor (e.g., an advisor number, email address, and the like), the location of the advisor, the identity of the client, the location of the client, the client's citizenship, the client's primary place of residence, the client's primary place or business, where the client pays taxes, the jurisdiction where the company was formed, where the managers of a company, shareholders, or decision-makers are located, where trustees of a trust reside, the identity of the beneficial owners of a trust and where they reside, whether the client is a new client or an existing client, when the client's relationship with the institution or advisor began, among other prompts.

In step 260, the U/I and prompt generation computing device 101 may generate or otherwise determine user interfaces for one or more of the determined prompts. The user interfaces may electronically present the prompts, such as in the form of an electronic questionnaire, to advisors' workstations 141 and/or directly to the client devices 161. As will be described in further detail below, advisors and/or clients may make selections or otherwise input data (e.g., via input/output devices on their respective devices) using drop-down menus, checkboxes, text fields, and the like displayed on the user interfaces. As previously explained, each jurisdiction may be associated with a plurality of prompts in a data structure, such as a table, via their unique identifiers. Each jurisdiction may similarly be associated to one or more user interfaces that present those prompts. Returning to the example above, the table may correlate Jurisdiction A with user interface(s) that display prompts 1-5, 7, 9-12, and 14 (11 prompts total), and may correlate Jurisdiction B with user interface(s) that display prompts 1, 3-5, and 7-12 (10 prompts total). One or several prompts may be displayed on each user interface screen. For example, all 11 prompts for Jurisdiction A may be displayed on a single user interface screen, or the 11 prompts may be divided across multiple user interface screens (e.g., 11 screens if each prompt is displayed individually, 4 screens, 2 screens, and the like). Accordingly, user interfaces may be customized for each jurisdiction. On the other hand, the same user interfaces or questionnaire may be used for two or more jurisdictions, such as all of the jurisdictions.

In step 270, the U/I and prompt generation computing device 101 may determine, for each jurisdiction, an order of presentation for the prompts and/or user interfaces. Prompts may be displayed on user interfaces in a particular order, such as sequentially. For example, for Jurisdiction B, prompt 1 may be displayed first, prompt 3 may be displayed second, prompt 4 may be displayed third, prompt 5 may be displayed fourth, prompt 7 may be displayed fifth, and so on. As another example, certain prompts might be presented (or not presented) based on the user's answer to a previous prompt. As a brief example, if the user selects "yes" to prompt 1, a user interface displaying prompts 2, 3, and 4 may be displayed to the user. If the user instead selects "no" to prompt 1, a user interface displaying prompt 5 may be displayed to the user. Accordingly, user's selections or other data inputs may be used to dynamically determine the next user interface or prompt to be presented to the user. Dynamic user interfaces and prompts will be described in further detail below.

In step 280, the U/I and prompt generation computing device 101 may store the prompts, user interfaces, and/or order of presentation at a storage location, such as in the memory 105 of the U/I and prompt generation computing device 101 (e.g., as data 107) and/or at the data store 121. As previously explained, the data may be stored in a data structure, such as a table, that correlates jurisdictions to their respective prompts, user interfaces, and/or order of presentation of prompts and user interfaces. The data stored in the table may be identified by unique codes.

Figure 3:
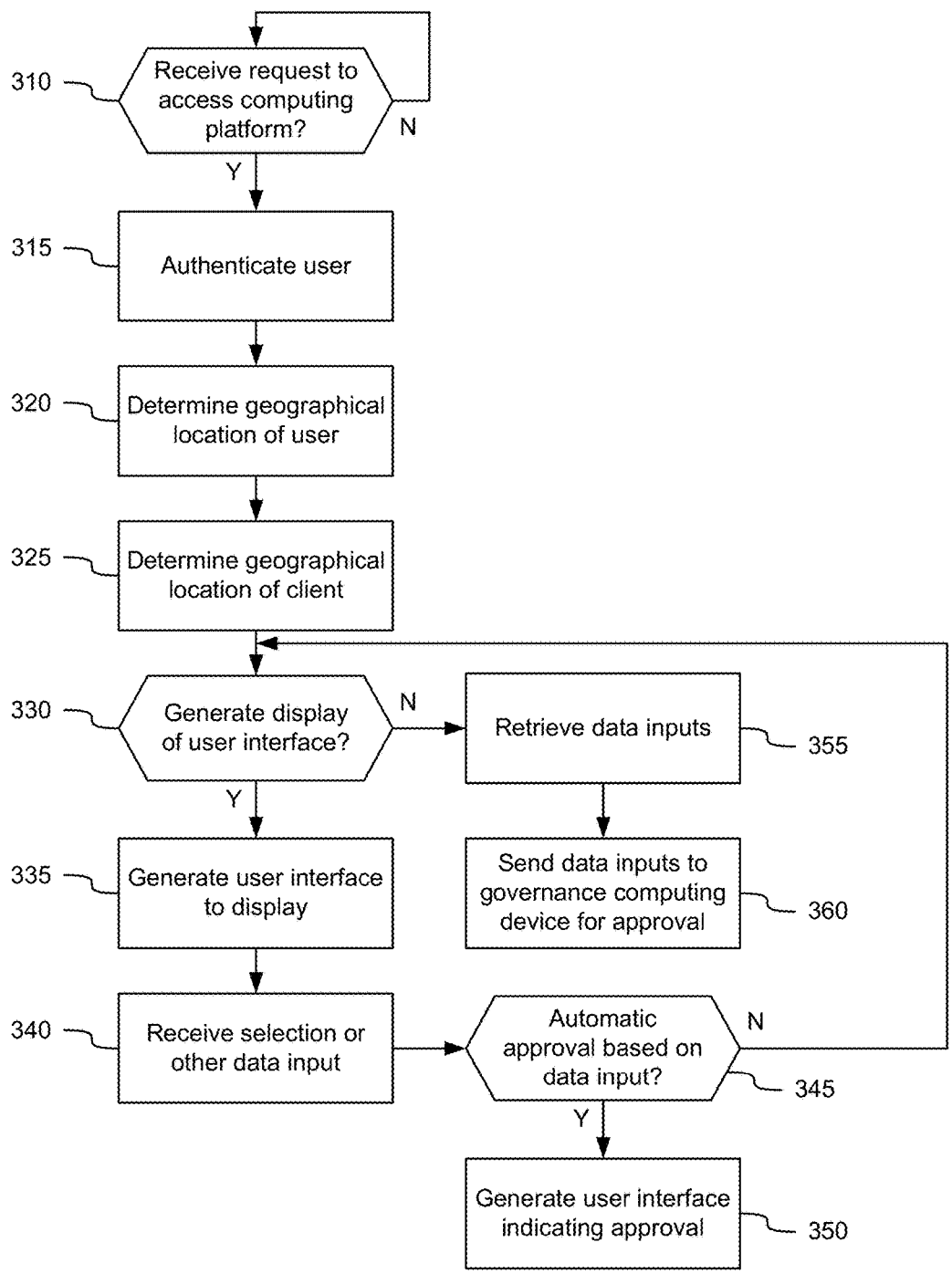
FIG. 3 illustrates an example of at least a portion of a flow diagram for determining a location of a user and/or a client and generating one or more user interfaces in which various aspects of the disclosure may be implemented.

FIG. 3 illustrates an example of at least a portion of a flow diagram for determining a location of a user and/or a client and generating one or more user interfaces in which various aspects of the disclosure may be implemented. The steps illustrated in FIG. 3 may be performed by one or more computing devices in the network of computing devices 100, such as by the U/I and prompt generation computing device 101, the workstation 141, the client devices 161A and 161B, and/or the governance computing device 171.

In step 310, the U/I and prompt generation computing device 101 may determine whether the computing device 101 has received a request to access the computing platform 109 (or data generated by the computing platform 109). For example, a user on the workstation 141 may initiate the client application 149 or otherwise request access to the computing platform 109. In some embodiments, the client application 149 may run locally on the workstation 141 and/or may comprise a web-based application accessible via the workstation 141, such as using a web browser application. A client may similarly request to access the computing platform 109 via a client device 161.

In step 315, the U/I and prompt generation computing device 101 may receive a request from the workstation 141 to access the computing platform 109 (or data generated by the platform 109). In response to the request, the user may be authenticated. The user may provide logon credentials using the input/output module 153, such as a username and password, a one-time password, biometrics, location data, and the like. Once the user has been authenticated, the user may be granted access to the computing platform 109, user interfaces associated with the computing platform 109, and data stored at the U/I and prompt generation computing device 101 and/or data store 121.

In step 320, a computing device, such as the U/I and prompt generation computing device 101 and/or the workstation 141, may determine the geographical location of the user requesting access to the computing platform 109. The user might not need to provide an input for the computing device to determine the user's geographical location. For example, the computing device may determine the location based on the IP address or other network address of the workstation 141. The computing device may similarly determine the location based on location sensors of the workstation 141, such as GPS, Wi-Fi, cellular network connections, and the like. The computing device may also determine the user's geographical location based on the user's profile accessible to the computing platform 109 and/or client application 149. For example, the user's profile might indicate that the user is located in Country 4. Additionally or alternatively, the workstation 141 may display a user interface requesting the user to provide the user's location. The user may make a selection using a drop-down menu, search for a location, and/or provide a text input of the location.

Figure 6:
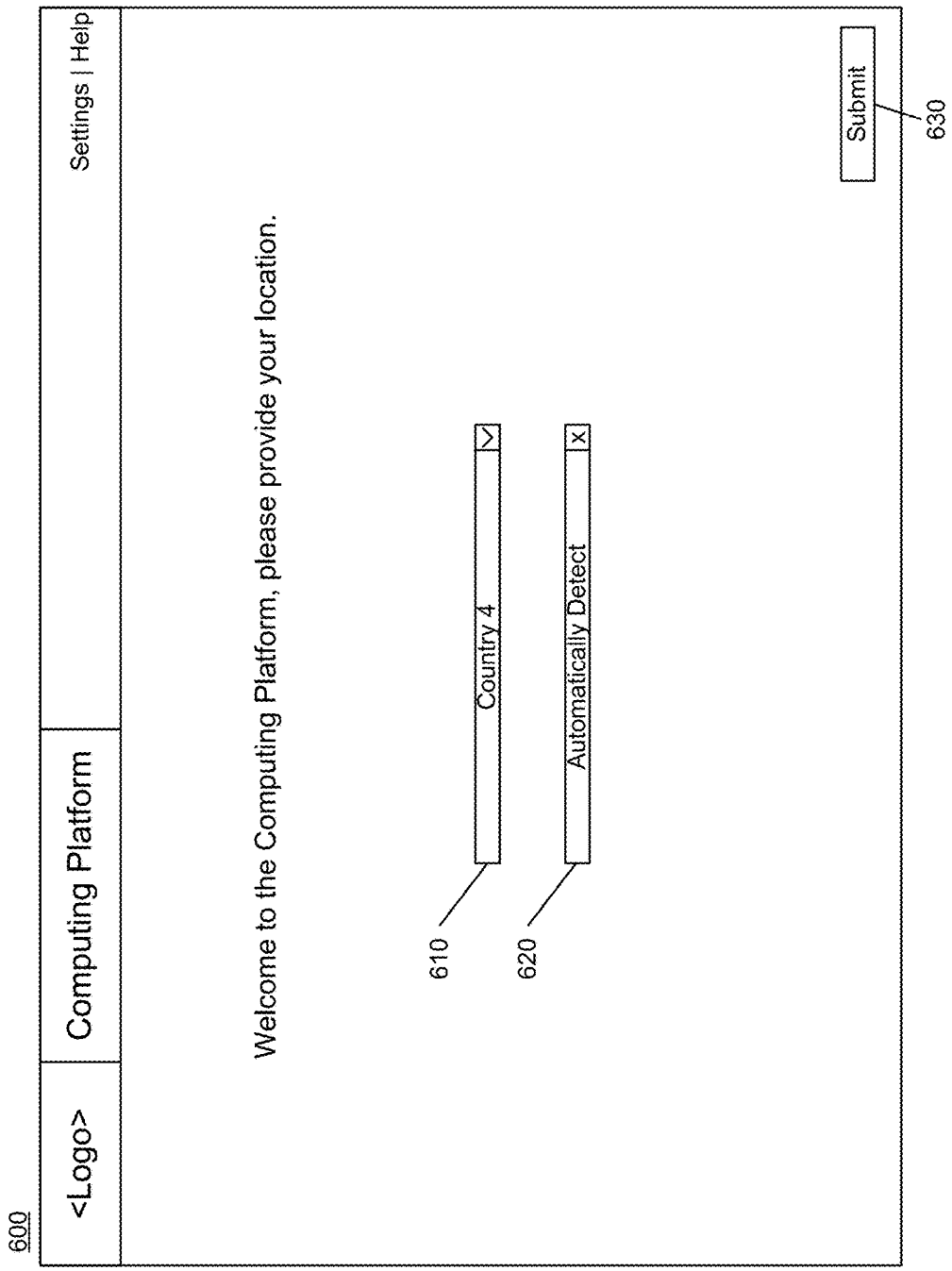
FIG. 6 illustrates an example user interface for providing the location of a user in which various aspects of the disclosure may be implemented.

FIG. 6 illustrates an example user interface 600 for providing the location of a user in which various aspects of the disclosure may be implemented. For example, the user may select his or her location using data field 610, which may comprise a drop-down menu and/or may allow the user to search for a location or input a character string for the location. The user interface 600 may also display an option 620 for the system 100 to automatically detect the user's location, such as via the IP address, GPS, user profile, and the like. The user interface 600 may display a submit option 630, and the system 100 may determine the user's location in response to a selection of the submit option 630.

Returning to FIG. 3, in step 325, a computing device, such as the U/I and prompt generation computing device 101, the workstation 141, and/or one or more of the client devices 161A and 161B, may determine the geographical location of the client. Similar to determining the user's location in step 320, the client might not need to provide an input for the computing device to determine the client's geographical location. For example, the computing device may determine the location based on the IP address or other network address of the client device 161. The computing device may similarly determine the location based on location sensors of the client device 161, such as GPS, Wi-Fi, cellular network connections, and the like. The computing device may also determine the client's geographical location based on the client's profile (if the client exists in the system) accessible to the computing platform 109 and/or client device 161. For example, the client's profile might indicate that the client is located in Country 1. Additionally or alternatively, the client device 161 may display a user interface requesting the client to provide the client's location. The client may make a selection using a drop-down menu, search for a location, and/or provide a text input of the location.

Figure 7:
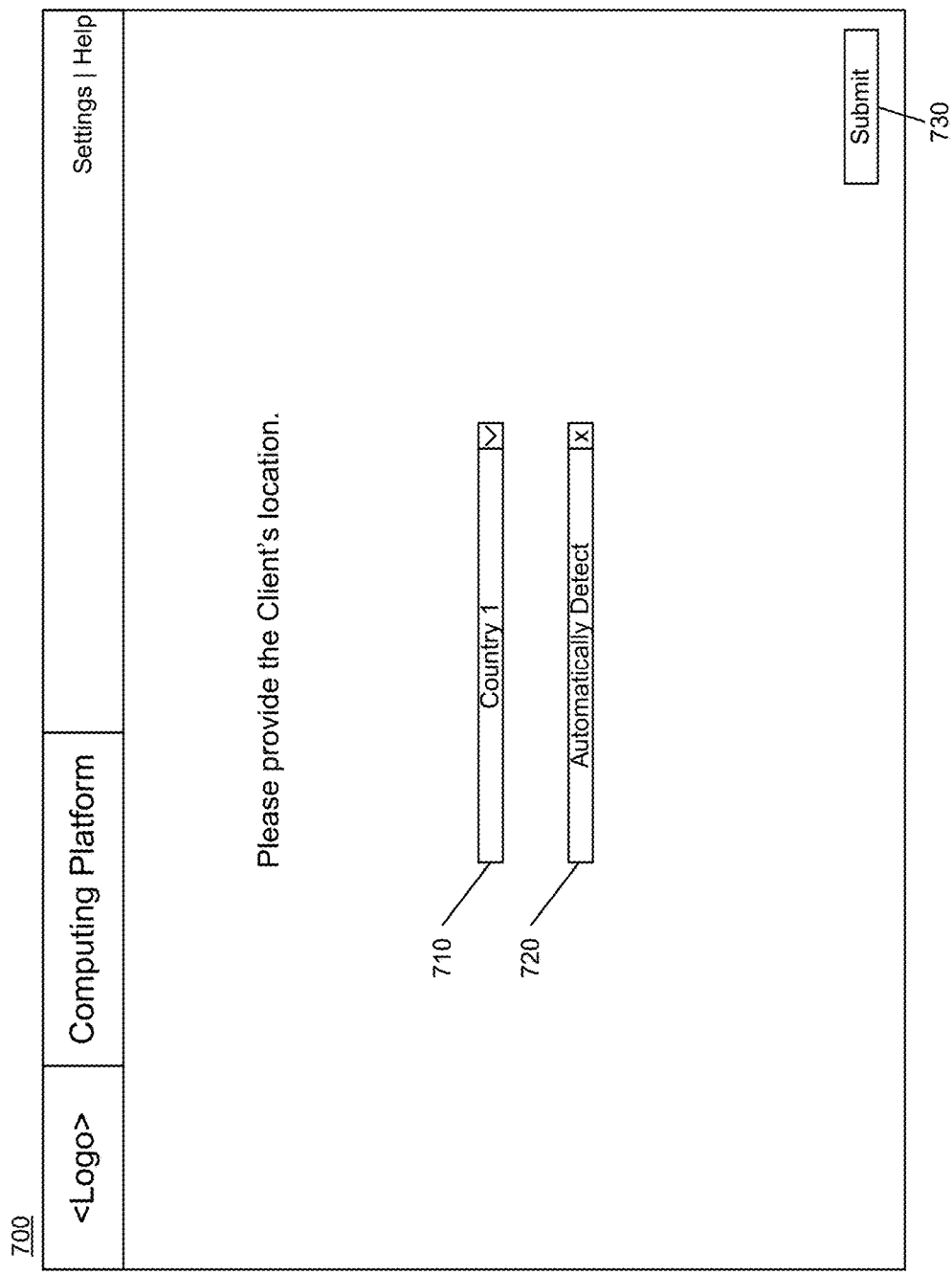
FIG. 7 illustrates an example user interface for providing the location of a client in which various aspects of the disclosure may be implemented.

FIG. 7 illustrates an example user interface 700 for providing the location of a client in which various aspects of the disclosure may be implemented. For example, the client may select his or her location using data field 710, which may comprise a drop-down menu and/or may allow the client to search for a location or input a character string for the location. The user interface 700 may also display an option 720 for the system 100 to automatically detect the client's location, such as via the IP address, GPS, user profile, and the like. The user interface 700 may display a submit option 730, and the system 100 may determine the client's location in response to a selection of the submit option 730. In some aspects, the user interface 700 may be displayed at the workstation 141 instead of the client device 161. In other words, the user of the workstation 141 may be prompted to select both the location of the user and the location of the client.

Returning to FIG. 3, in step 330, the U/I and prompt generation computing device 101 and/or the workstation 141 may determine whether to generate a display of a user interface, such as a user interface displaying one or more prompts based on the client's jurisdiction. In some aspects, the U/I and prompt generation computing device 101 and/or the workstation 141 may determine whether all of the prompts associated with the client's jurisdiction have been answered. If the U/I and prompt generation computing device 101 and/or the workstation 141 determines not to display another user interface (step 330: N), the method may proceed to step 355, as will be described below. On the other hand, if the U/I and prompt generation computing device 101 and/or the workstation 141 determines to display a user interface (step 330: Y), the method may proceed to step 335.

In step 335, the U/I and prompt generation computing device 101 and/or the workstation 141 may generate a user interface to display on the workstation 141 (or directly on the client device 161). The computing device 101 or workstation 141 may select the user interface to display based on data input by the user or the client (or automatically detected) in steps 320 and/or 325, such as the user's geographical location or the client's geographical location. In particular, the U/I and prompt generation computing device 101 and/or the workstation 141 may access the data stored in step 280 (e.g., user interfaces, prompts, order of presentation, jurisdiction, and the correlation between the data). Based on the stored data (e.g., jurisdiction information), the U/I and prompt generation computing device 101 and/or the workstation 141 may determine the prompts to be answered by the user at the workstation 141 or the client at the client device 161. The generated user interface may be displayed on the workstation 141, so that the user can respond to the prompts for the client, or directly at the client device 161, so that the client can respond directly to the prompts. In some aspects, the user interface may be displayed on both the workstation 141 and the client device 161, such as a parallel or shared screen. The client application 149 of the workstation 141 (or an equivalent application at the client device 161) may retrieve the prompt, user interface, or presentation order data from the data store 121 or the memory 105. The client application 149 (or an application at the client device 161) may display the user interface based on the retrieved data.

Figure 8:
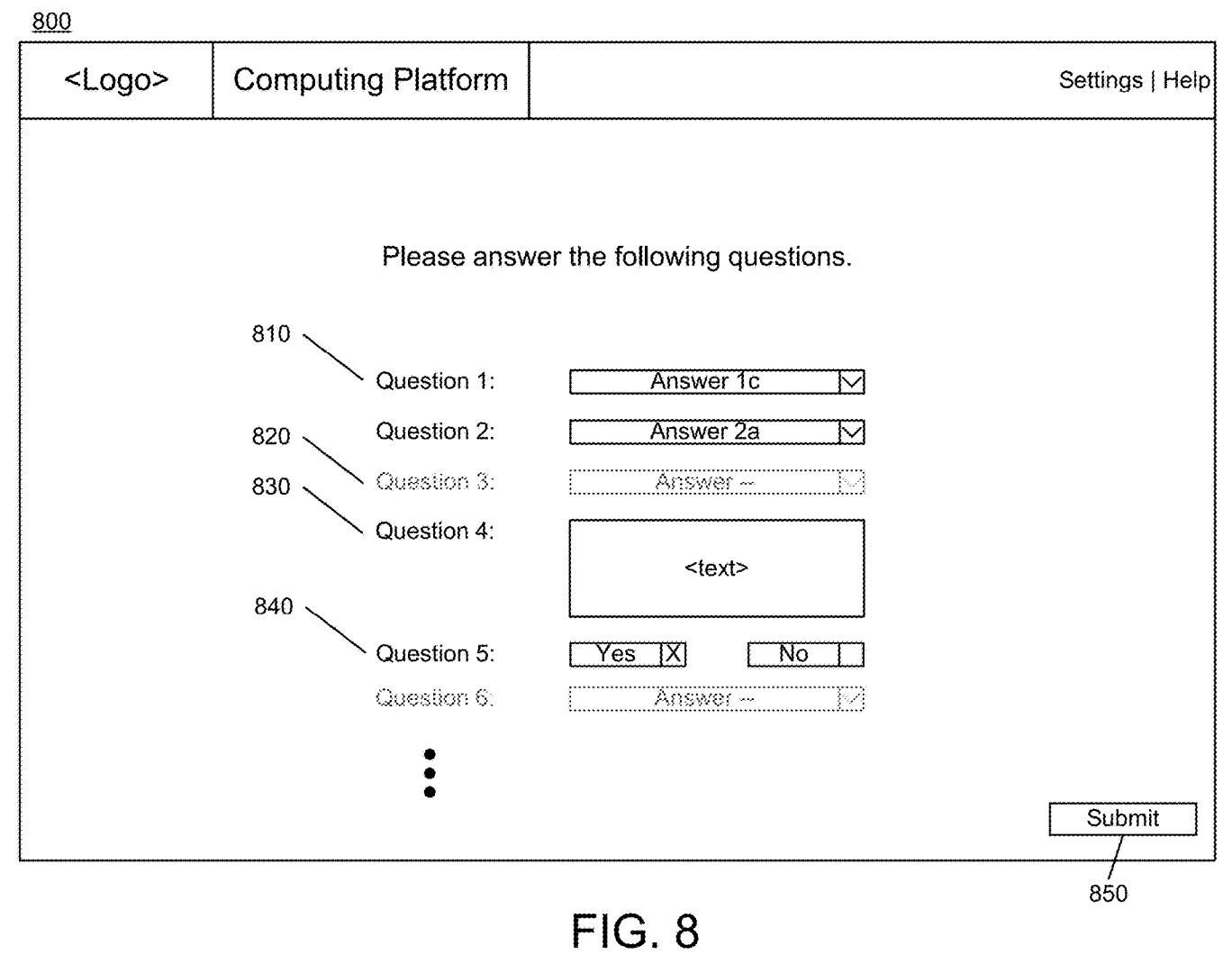

FIG. 8 illustrates an example user interface 800 for displaying questions and receiving selections or other data input in which various aspects of the disclosure may be implemented. The user interface 800 may display a plurality of prompts, which may be questions. Some of the questions, such as question 3 (820) and question 6, may be deemphasized (e.g., greyed-out or otherwise made less visible on a display device). The deemphasized questions might not need to be answered for the user or client's particular jurisdiction. Some of the questions, such as question 1 (810), question 2, question 4 (830), and question 5 (840), may be emphasized (e.g., in a more visible font or other manner) relative to the deemphasized questions. These questions might need to be answered (or can be answered) for the user or client's particular jurisdiction. As previously explained, the user or client may respond to a question by selecting an answer from a drop-down menu, providing text, or selecting yes or no. While 6 questions are illustrated for the user interface 800, any number of questions may be displayed to the user or client. As previously explained, the U/I and prompt generation computing device 101 and/or the workstation 141 may determine which questions to display in black or in grey based on which questions are correlated to the particular jurisdiction. The user or client may select the submit option 850 to submit the responses.

FIG. 9 illustrates another example user interface 900 for displaying questions and receiving selections or other data input in which various aspects of the disclosure may be implemented. The user interface 900 may display a plurality of prompts, which may be questions. In some aspects, the user interface 900 may display questions 910 that might need to be answered (or can be answered) for the user or client's particular jurisdiction. That is, the user interface 900 might not display questions that do not need to be answered by the user or client. For example, the user interface 900 might not display question 3 or question 6. As previously explained, the U/I and prompt generation computing device 101 and/or the workstation 141 may determine which questions to display based on which questions are correlated to the particular jurisdiction. The user or client may select the submit option 920 to submit the responses. In some aspects, it might be beneficial to display all questions to the user or client, such as questions 1-6, without considering the jurisdiction. In these aspects, indicators (e.g., asterisks or other indicators) might be placed next to the questions that are required for that jurisdiction. However, the user or client may be free to answer the other questions.

FIGS. 10A-B illustrate yet other example user interfaces 1000 for displaying questions and receiving selections or other data input in which various aspects of the disclosure may be implemented. In some aspects, each question may be sequentially displayed on a separate user interface. For example (and with reference to FIG. 9), question 1 might be displayed on a first user interface. Once the user selects the submit option 920, question 2 might be displayed on the user interface. Once the user selects the submit option 920 again, question 4 might be displayed on the user interface, and so on.

In additional aspects, a user or client's answer to a question may be used to determine the next user interface to be displayed. With reference to FIG. 10A, the user interface 1000 may display a question 1 (1010). Assume that the user selects answer 1c from a dropdown menu and selects the submit option 1020. In response to the selection, the user interface 1000 illustrated in FIG. 10B may be displayed to the user or client. That is, in response to the user selecting answer 1c for question 1, question 4 (1030) may be displayed to the user and question 2 may be skipped. Successive user interfaces may be displayed until all of the prompts associated with a jurisdiction have been displayed and/or answered. This dynamic order of presentation may have previously been stored at the computing device 101 or the data store 121, as described with reference to step 280.

Returning to FIG. 3, in step 340, the workstation 141 may receive a selection or other data input from the user. As previously explained, the user or client may make a selection, such as via a drop-down menu, a text box, or selecting yes or no to a question. The user or client may select a submit option, and the workstation 141 (or client device 161) may send the selection to the U/I and prompt generation computing device 101.

In step 345, the U/I and prompt generation computing device 101 and/or the workstation 141 may determine whether to automatically approve the user's request based on the received data input. For example, the user may be requesting to register (or requesting on another user's behalf) with an institution generally or to sign up for a specific product or service of the institution. In order to complete the registration, one or more questions may be presented to the user, as described above. In some aspects, a particular combination of answers may result in an automatic approval of the user to be registered for the institution generally or to sign up for a specific product or service. The answers required for an automatic approval for a particular jurisdiction may be stored at the computing device 101 or the database 121, as previously described. If the U/I and prompt generation computing device 101 and/or the workstation 141 determines to automatically approve the user (step 345: Y), the computing device 101 and/or the workstation 141 may generate a user interface indicating approval of the request in step 350. However, the computing device 101 and/or the workstation 141 may determine not to automatically approve the user (step 345: N), such as if not all of the received answers correlates to the answers required for an automatic approval or the user has not yet answered all of the questions corresponding to the required answers. If this is the case, the computing device 101 and/or workstation 141 may return to step 330 to determine whether another user interface (with additional prompts) should be displayed. If another user interface is not to be displayed (step 330: N), the computing device 101 and/or workstation 141 may proceed to step 355.

In step 355, the U/I and prompt generation computing device 101 and/or the workstation 141 may retrieve and/or combine the data input by the user, such as the responses to the prompts presented on one or more user interfaces.

In step 360, the U/I and prompt generation computing device 101 and/or the workstation 141 may send the combined data inputs to the governance computing device 171 for approval by a governance team. The data inputs may be sent to the governance computing device 171 if the user's request is not automatically approved in step 345, as previously described. In some aspects, the responses may be sent electronically to the governance computing device 171, such as via email or a web portal. A user of the governance computing device 171 (or another computing device) may make a determination whether to register the user with the institution or with a particular product or service based on the user's responses to prompts. In some aspects, a governance team may be divided by specialty (e.g., specialty with particular jurisdiction or with a particular product or service). The responses may be sent in step 360 to the appropriate governance team member based on the jurisdiction, the product or service requested, or the responses themselves.

Figure 4:
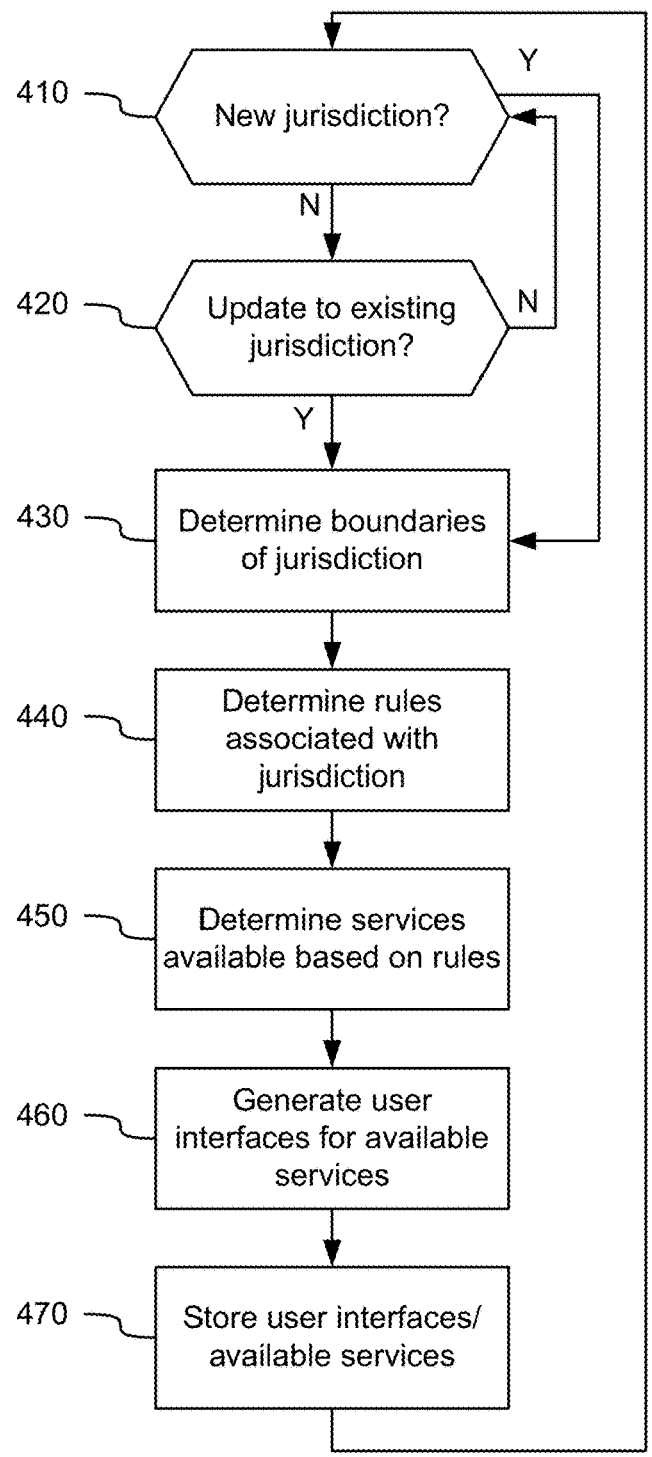
FIG. 4 illustrates an example of at least a portion of a flow diagram for determining services available and/or user interfaces for one or more jurisdictions in which various aspects of the disclosure may be implemented.

FIG. 4 illustrates an example of at least a portion of a flow diagram for determining services available and/or user interfaces for one or more jurisdictions in which various aspects of the disclosure may be implemented. The steps illustrated in FIG. 4 may be performed by one or more computing devices in the network of computing devices 100, such as by the U/I and prompt generation computing device 101 and/or the data store 121.

In step 410, the U/I and prompt generation computing device 101 may determine whether a new jurisdiction has been or should be added to a system 100. Step 410 may be similar or identical to step 210 previously described with reference to FIG. 2.

In step 420, the U/I and prompt generation computing device 101 may determine whether there has been an update to a jurisdiction already in the system 100, such as an update to the rules of the existing jurisdiction. Step 420 may be similar or identical to step 220 previously described with reference to FIG. 2.

In step 430, the U/I and prompt generation computing device 101 may determine the boundaries of the jurisdiction. Step 430 may be similar or identical to step 230 previously described with reference to FIG. 2.

In step 440, the U/I and prompt generation computing device 101 may determine the rules associated with the jurisdiction. Step 440 may be similar or identical to step 240 previously described with reference to FIG. 2.

In step 450, the U/I and prompt generation computing device 101 may determine the services available to the client based on the rules associated with the jurisdiction. The computing device 101 may assign a unique code (or other identifier) to each service, and the unique code may be stored with the service, such as in the data store 121 or other storage device. The computing device 101 may also generate or update a table or other data structure that correlates jurisdictions to services (and/or their corresponding identifiers). For example, the table may correlate Jurisdiction A with services 1-3 and 7. As another example, the table may correlate Jurisdiction B with services 1 and 4-10. The table may include entries for any number of jurisdictions and their corresponding services. Exemplary services may include investment choices that are available based on the client's jurisdiction.

In step 460, the U/I and prompt generation computing device 101 may generate or otherwise determine user interfaces for one or more of the available services. Step 460 may be similar to step 260 previously described with reference to FIG. 2. The user interfaces may electronically present the available services to advisors' workstations 141 and/or directly to the client devices 161. As will be described in further detail below, advisors and/or clients may make selections or otherwise input data (e.g., via input/output devices on their respective devices) using dropdown menus, checkboxes, text fields, and the like displayed on the user interfaces. As previously explained, each jurisdiction may be associated with a plurality of available services in a data structure, such as a table, via their unique identifiers. Each jurisdiction may similarly be associated with one or more user interfaces that present those services. Returning to the example above, the table may correlate Jurisdiction A with user interface(s) that display services 1-3 and 7 (4 services total), and may correlate Jurisdiction B with user interface(s) that display services 1 and 4-10 (8 services total). One or several services may be displayed on each user interface screen. For example, all 4 services for Jurisdiction A may be displayed on a single user interface screen, or the 4 services may be displayed on multiple user interface screens (e.g., 4 screens if each service is displayed individually, 3 screens, or 2 screens). Accordingly, user interfaces may be customized for each jurisdiction. On the other hand, the same user interfaces may be used for two or more jurisdictions, such as all of the jurisdictions.

In step 470, the U/I and prompt generation computing device 101 may store the user interfaces and/or available services at a storage location, such as in the memory 105 of the U/I and prompt generation computing device 101 (e.g., as data 107) and/or at the data store 121. Step 470 may be similar to step 280 previously described with reference to FIG. 2. The data may be stored in a data structure, such as a table, that correlates jurisdictions to their respective available services and/or user interfaces. The data stored in the table may be identified by unique codes.

Figure 5:
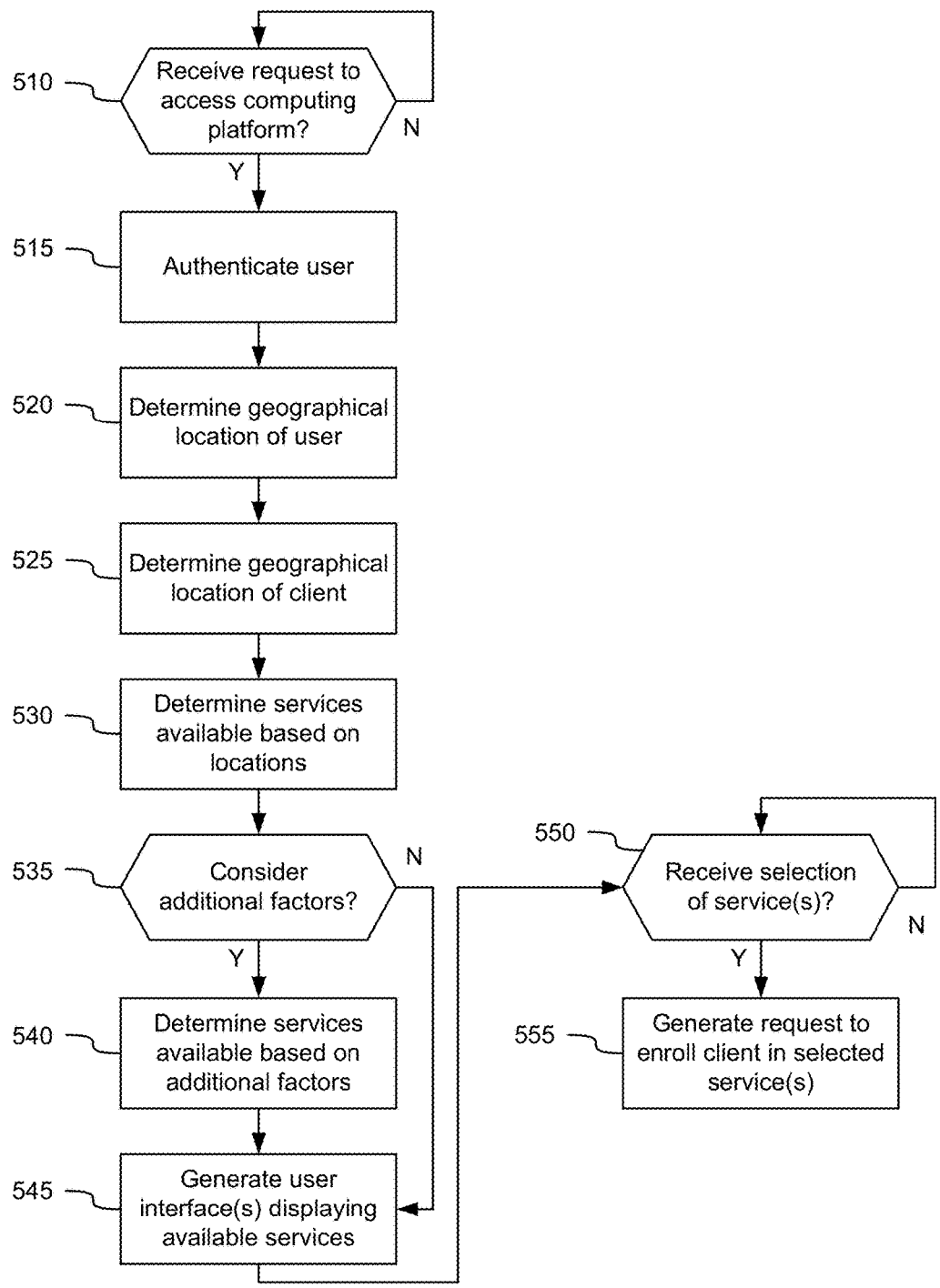
FIG. 5 illustrates an example of at least a portion of a flow diagram for determining a location of a user and/or a client and determining one or more available services in which various aspects of the disclosure may be implemented.

FIG. 5 illustrates an example of at least a portion of a flow diagram for determining a location of a user and/or a client and determining one or more available services in which various aspects of the disclosure may be implemented. The steps illustrated in FIG. 5 may be performed by one or more computing devices in the network of computing devices 100, such as by the U/I and prompt generation computing device 101, the workstation 141, the client devices 161A and 161B, and/or the governance computing device 171.

In step 510, the U/I and prompt generation computing device 101 may determine whether the computing device 101 has received a request to access the computing platform 109 (or data generated by the computing platform 109). Step 510 may be similar or identical to step 310 previously described with reference to FIG. 3.

In step 515, the user may be authenticated. Step 515 may be similar or identical to step 315 previously described with reference to FIG. 3.

In step 520, a computing device, such as the U/I and prompt generation computing device 101 and/or the workstation 141, may determine the geographical location of the user requesting access to the computing platform 109. Step 520 may be similar or identical to step 320 previously described with reference to FIG. 3. The example user interface 600 illustrated in FIG. 6 may be displayed to determine the user's location.

In step 525, a computing device, such as the U/I and prompt generation computing device 101, the workstation 141, and/or one or more of the client devices 161A and 161B, may determine the geographical location of the client. Step 525 may be similar or identical to step 325 previously described with reference to FIG. 3. The example user interface 700 illustrated in FIG. 7 may be displayed to determine the client's location.

In step 530, the U/I and prompt generation computing device 101 and/or the workstation 141 may determine services available to the client based on the location of the user and/or the location of the client. For example, the computing device 101 or workstation 141 may retrieve the data stored in step 470, which may correlate jurisdictions to one or more available services. Based on the location of the user or the client, the computing device 101 and/or workstation 141 may determine the services available at the location. For example, the computing device 101 or workstation 141 may determine different investment choices based on where the client lives. That is, the services may be customized based on the client's location.

In step 535, the U/I and prompt generation computing device 101 and/or the workstation 141 may determine whether to consider additional factors to determine services available to the client. Other factors include, but are not limited to, the client's level of risk, the client's income level, the client's risk tolerance objectives, products or services the client is currently enrolled in, the user's (e.g., financial advisor's) preferences or recommendations, and the like. If the computing device 101 and/or the workstation 141 determines to consider additional factors (step 535: Y), it may determine the services available to the client based on the additional factors in step 540. For example, the computing device 101 and/or workstation 141 may reduce the number of services available to the client based on the additional factors or reorder the recommended services based on the factors. On the other hand, if the computing device 101 and/or workstation 141 determines not to consider additional factors (step 535: N), it may proceed to step 545.

In step 545, the U/I and prompt generation computing device 101 and/or the workstation 141 may generate one or more user interface(s) displaying the services available to the client. The user interface may be displayed on the workstation 141 (or directly on the client device 161). The computing device 101 or workstation 141 may select the user interface to display based on data input by the user or the client (or automatically detected) in steps 520 and/or 525, such as the user's geographical location or the client's geographical location. In particular, the U/I and prompt generation computing device 101 and/or the workstation 141 may access the data stored in step 470 (e.g., user interfaces, available services, jurisdiction, and the correlation between the data). Based on the stored data (e.g., jurisdiction information), the U/I and prompt generation computing device 101 and/or the workstation 141 may determine the services selectable by the advisor at the workstation 141 or by the client at the client device 161. The generated user interface may be displayed on the workstation 141, so that the advisor can select one or more services for the client, or directly at the client device 161, so that the client can directly select one or more services. In some aspects, the user interface may be displayed on both the workstation 141 and the client device 161, such as a parallel or shared screen. The client application 149 of the workstation 141 (or an equivalent application at the client device 161) may retrieve the services or user interface data from the data store 121 or the memory 105. The client application 149 (or an application at the client device 161) may display the user interface based on the retrieved data.

Figure 11:
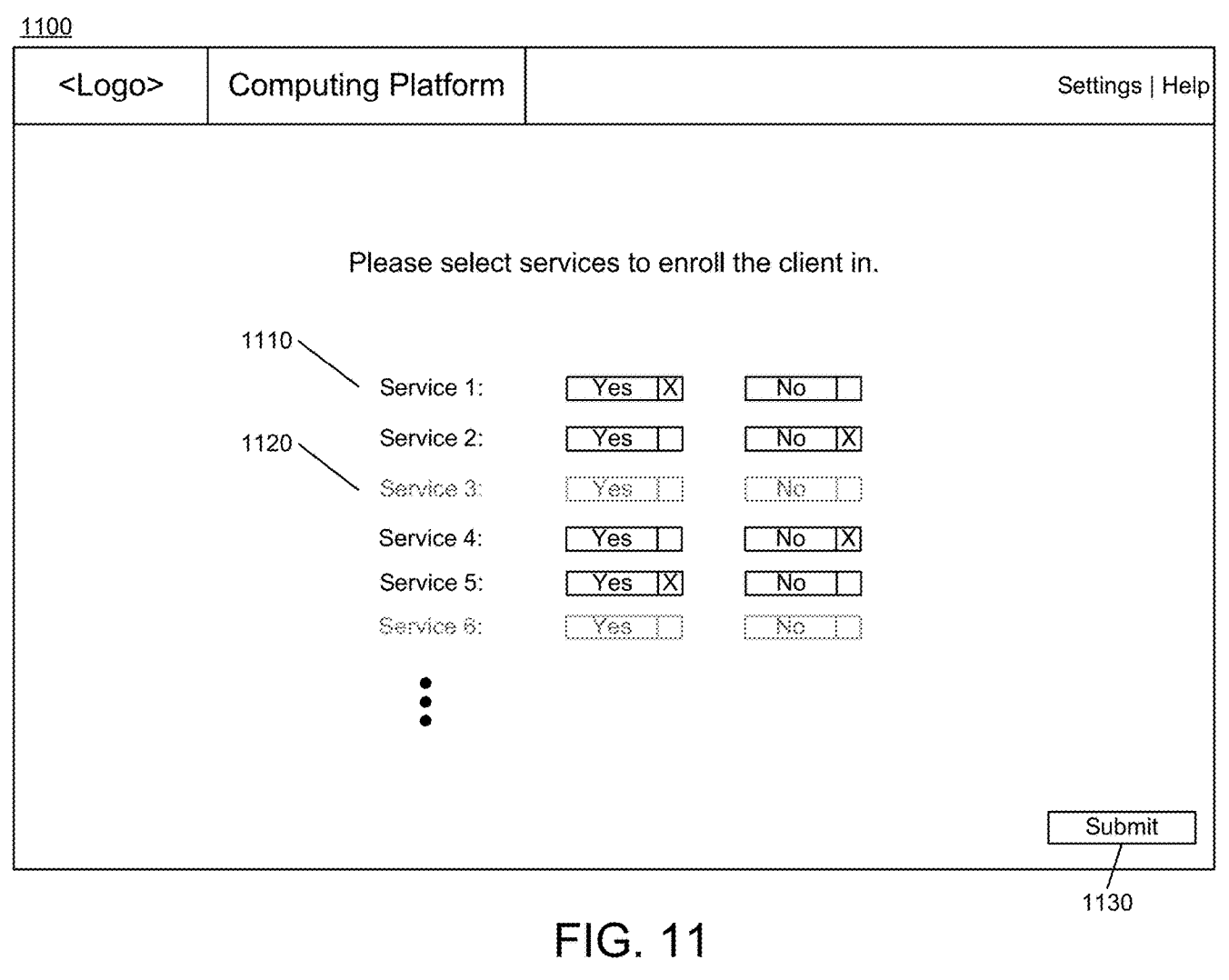

FIG. 11 illustrates an example user interface 1100 for displaying available services and receiving selections or other data input in which various aspects of the disclosure may be implemented. The user interface 1100 may display a plurality of services. Some of the services, such as service 3 (1120) and service 6, may be deemphasized (e.g., greyed-out or otherwise made less visible on a display device). The deemphasized services might not be available at the client's particular jurisdiction or based on the user's solicitation of the client. Some of the services, such as service 1 (1110), service 2, service 4, and service 5, may be emphasized (e.g., in a more visible font or other manner) relative to the deemphasized services. These services may be available at the client's particular jurisdiction. The user or client may select one or more of the services to enroll the client in. While 6 services are illustrated for the user interface 1100, any number of services may be displayed to the user or client. As previously explained, the U/I and prompt generation computing device 101 and/or the workstation 141 may determine which services to display in black or in grey based on which services are correlated to the particular jurisdiction. The user or client may select the submit option 1130 to submit a request for the selected services.

FIG. 12 illustrates another example user interface 1200 for displaying available services and receiving selections or other data input in which various aspects of the disclosure may be implemented. The user interface 1200 may display a plurality of services available to the client. In some aspects, the user interface 1200 may display services 1210 that are available at the client's particular jurisdiction. That is, the user interface 1200 might not display services that are not available. For example, the user interface 1200 might not display service 3 or service 6 (which are not available at the client's jurisdiction). As previously explained, the U/I and prompt generation computing device 101 and/or the workstation 141 may determine which services to display based on which services are correlated to the particular jurisdiction. The user or client may select the submit option 1220 to submit the request for one or more services. In some aspects, it might be beneficial to display all services to the user or client, such as services 1-6, without considering the jurisdiction. In these aspects, indicators (e.g., asterisks or other indicators) might be placed next to the services that are available (or that are not available) for that jurisdiction. These indicators may be helpful for the advisor to explain to the client why a particular service might not be available.

Returning to FIG. 5, in step 550, the U/I and prompt generation computing device 101 and/or the workstation 141 may wait to receive a selection of one or more services. As previously explained, the user or client may make a selection and may select a submit option, and the workstation 141 (or client device 161) may send the selection to the U/I and prompt generation computing device 101.

In step 555, the U/I and prompt generation computing device 101 and/or the workstation 141 may generate a request to enroll the client in the one or more selected services. The request may be sent to, for example, the governance computing device 171. In some aspects, the request may be sent electronically to the governance computing device 171, such as via email or a portal. A user of the governance computing device 171 (or another computing device) may make a determination whether to enroll the client in a particular service based on the user's or client's selections. In some aspects, a governance team may be divided by specialty (e.g., specialty with particular jurisdiction or with a particular service). The responses may be sent in step 555 to the appropriate governance team member based on the jurisdiction or the service(s) requested.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system, comprising:
   a user device comprising:
   a first processor;

a display screen;
a location sensor; and
first memory storing computer-executable instructions that, when executed by the first processor, cause the user device to:
    determine a geographical location of a first user of the user device by automatically detecting the geographical location of the first user based on one or more of a network address of the user device or location data generated by the location sensor of the user device; and
    send the geographical location of the first user to a user interface (UI) generation computing device; and
the UI generation computing device comprising:
a second processor; and
second memory storing computer-executable instructions that, when executed by the second processor, cause the UI generation computing device to:
    receive, from the user device, the geographical location of the first user of the user device;
    based on the received geographical location of the first user of the user device, determine a first geographical region associated with the first user of the user device, wherein the first geographical region has boundaries, wherein the first geographical region comprises a first country, and wherein the first geographical region includes the received geographical location of the first user of the user device;
    receive, from a client device, a geographical location of a second user of the client device, wherein the geographical location of the second user of the client device is automatically detected based on one or more of a network address of the client device or location data generated by a location sensor of the client device;
    based on the received geographical location of the second user of the client device, determine a second geographical region associated with the second user of the client device, wherein the second geographical region has boundaries, wherein the second geographical region comprises a second country different from the first country, and wherein the second geographical region includes the received geographical location of the second user of the client device;
    based on the determined first geographical region associated with the first user of the user device and based on the determined second geographical region associated with the second user of the client device, determine a plurality of available services for the second user;
    generate one or more user interfaces configured to display the plurality of available services;
    receive, from the user device and via the one or more user interfaces, data input indicating a selection of one or more of the plurality of available services;
    generate, based on the data input, a request to enroll the second user in the selected one or more of the plurality of available services;
    receive an indication of one or more updates to services available at the second geographical region; and
    based on the one or more updates to services available at the second geographical region, store, at a database, a correlation between a plurality of unique identifiers for a second plurality of available services and the second geographical region.

2. The system of claim 1, wherein determining the geographical location of the first user comprises:
    displaying, on the display screen of the user device, a user interface requesting input of the geographical location of the first user; and
    receiving, at the user device via an input/output module of the user device, input of the geographical location of the first user.

3. The system of claim 1, wherein generating the one or more user interfaces configured to display the plurality of available services comprises generating the one or more user interfaces to include the determined plurality of available services and to exclude one or more services not available at the determined second geographical region associated with the second user.

4. The system of claim 1, wherein generating the one or more user interfaces configured to display the plurality of available services comprises generating the one or more user interfaces to include the determined plurality of available services and to include one or more services not available at the determined second geographical region associated with the second user, wherein the one or more services not available at the determined second geographical region associated with the second user is graphically distinguishable from the determined plurality of available services.

5. The system of claim 1, wherein determining the plurality of available services for the second user based on the determined first geographical region associated with the first user and based on the determined second geographical region associated with the second user comprises determining the plurality of available services for the second user based on the determined first geographical region associated with the first user, based on the determined second geographical region associated with the second user, and based on at least one or more additional factor.

6. A method, comprising:
    determining, by a computing device, a geographical location of a first user of a user device by automatically detecting the geographical location of the first user based on one or more of a network address of the user device or location data generated by a location sensor of the user device;
    based on the determined geographical location of the first user of the user device, determining, by the computing device, a first geographical region associated with the first user of the user device, wherein the first geographical region has boundaries, wherein the first geographical region comprises a first country, and wherein the first geographical region includes the determined geographical location of the first user of the user device;
    determining, by the computing device, a geographical location of a second user of a client device, wherein the geographical location of the second user of the client device is automatically detected based on one or more of a network address of the client device or location data generated by a location sensor of the client device;
    based on the determined geographical location of the second user of the client device, determining, by the computing device, a second geographical region associated with the second user of the client device, wherein the second geographical region has boundaries, wherein the second geographical region comprises a second country different from the first country, and wherein the second geographical region includes the determined geographical location of the second user of the client device;

based on the determined first geographical region associated with the first user of the user device and based on the determined second geographical region associated with the second user of the client device, determining, by the computing device, a plurality of available services for the second user;

generating, by the computing device, one or more user interfaces configured to display the plurality of available services;

receiving, via the one or more user interfaces, data input indicating a selection of one or more of the plurality of available services;

generating, based on the data input and by the computing device, a request to enroll the second user in the selected one or more of the plurality of available services;

receiving an indication of one or more updates to services available at the second geographical region; and based on the one or more updates to services available at the second geographical region, store, at a database, a correlation between a plurality of unique identifiers for a second plurality of available services and the second geographical region.

7. The method of claim 6, wherein determining the geographical location of the first user comprises receiving, from the user device, a user selection of the geographical location of the first user.

8. The method of claim 6, wherein generating the one or more user interfaces configured to display the plurality of available services comprises generating the one or more user interfaces to include the determined plurality of available services and to exclude one or more services not available at the determined second geographical region associated with the second user.

9. The method of claim 6, wherein generating the one or more user interfaces configured to display the plurality of available services comprises generating the one or more user interfaces to include the determined plurality of available services and to include one or more services not available at the determined second geographical region associated with the second user, wherein the one or more services not available at the determined second geographical region associated with the second user is graphically distinguishable from the determined plurality of available services.

10. The method of claim 6, wherein determining the plurality of available services for the second user based on the determined first geographical region associated with the first user and based on the determined second geographical region associated with the second user comprises determining the plurality of available services for the second user based on the determined first geographical region associated with the first user, based on the determined second geographical region associated with the second user, and based on at least one or more additional factor.

11. The method of claim 6, further comprising:
sending, by the computing device, the request to enroll the second user in the selected one or more of the plurality of available services to a governance computing device; and
determining, by the governance computing device, whether to enroll the second user in the selected one or more of the plurality of available services.

12. A non-transitory computer-readable medium having instructions stored thereon that, when executed, cause a computing device to:
determine a geographical location of a first user of a user device by automatically detecting the geographical location of the first user based on one or more of a network address of the user device or location data generated by a location sensor of the user device;
based on the determined geographical location of the first user of the user device, determine a first geographical region associated with the first user of the user device, wherein the first geographical region has boundaries, wherein the first geographical region comprises a first country, and wherein the first geographical region includes the determined geographical location of the first user of the user device;
determine a geographical location of a second user of a client device, wherein the geographical location of the second user of the client device is automatically detected based on one or more of a network address of the client device or location data generated by a location sensor of the client device;
based on the determined geographical location of the second user of the client device, determine a second geographical region associated with the second user of the client device, wherein the second geographical region has boundaries, wherein the second geographical region comprises a second country different from the first country, and wherein the second geographical region includes the determined geographical location of the second user of the client device;
based on the determined first geographical region associated with the first user of the user device and based on the determined second geographical region associated with the second user of the client device, determine a plurality of available services for the second user;
generate one or more user interfaces configured to display the plurality of available services;
receive, via the one or more user interfaces, data input indicating a selection of one or more of the plurality of available services;
generate, based on the data input, a request to enroll the second user in the selected one or more of the plurality of available services;
receive an indication of one or more updates to services available at the second geographical region; and
based on the one or more updates to services available at the second geographical region, store, at a database, a correlation between a plurality of unique identifiers for a second plurality of available services and the second geographical region.

13. The non-transitory computer-readable medium of claim 12, wherein generating the one or more user interfaces configured to display the plurality of available services comprises generating the one or more user interfaces to include the determined plurality of available services and to exclude one or more services not available at the determined second geographical region associated with the second user.

14. The non-transitory computer-readable medium of claim 12, wherein generating the one or more user interfaces configured to display the plurality of available services comprises generating the one or more user interfaces to include the determined plurality of available services and to include one or more services not available at the determined second geographical region associated with the second user, wherein the one or more services not available at the determined second geographical region associated with the second user is graphically distinguishable from the determined plurality of available services.

15. The non-transitory computer-readable medium of claim 12, wherein determining the plurality of available services for the second user based on the determined first geographical region associated with the first user and based on the determined second geographical region associated with the second user comprises determining the plurality of available services for the second user based on the determined first geographical region associated with the first user, based on the determined second geographical region associated with the second user, and based on at least one or more additional factor.

* * * * *